(12) United States Patent
Parkvall et al.

(10) Patent No.: US 8,341,484 B2
(45) Date of Patent: Dec. 25, 2012

(54) DATA BLOCK SIZE MANAGEMENT IN A COMMUNICATION SYSTEM UTILIZING HYBRID AUTOMATIC REPEAT REQUESTS WITH SOFT COMBINING

(75) Inventors: Stefan Parkvall, Stockholm (SE); Jung-Fu Cheng, Fremont, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 390 days.

(21) Appl. No.: 12/663,459

(22) PCT Filed: May 9, 2008

(86) PCT No.: PCT/SE2008/050539
§ 371 (c)(1),
(2), (4) Date: Dec. 7, 2009

(87) PCT Pub. No.: WO2009/020413
PCT Pub. Date: Feb. 12, 2009

(65) Prior Publication Data
US 2010/0199141 A1    Aug. 5, 2010

(30) Foreign Application Priority Data
Jun. 14, 2007  (SE) ...................... 0701477

(51) Int. Cl.
H04L 1/08 (2006.01)
(52) U.S. Cl. ...................................................... 714/749
(58) Field of Classification Search .................. 714/749
See application file for complete search history.

(56) References Cited

U.S. PATENT DOCUMENTS

| | | | | |
|---|---|---|---|---|
| 4,697,281 A | * | 9/1987 | O'Sullivan | 455/557 |
| 4,839,891 A | * | 6/1989 | Kobayashi et al. | 370/231 |
| 5,010,553 A | * | 4/1991 | Scheller et al. | 714/751 |
| 5,115,436 A | * | 5/1992 | McAuley | 714/781 |
| 5,537,416 A | * | 7/1996 | MacDonald et al. | 714/748 |
| 5,600,663 A | * | 2/1997 | Ayanoglu et al. | 714/774 |
| 5,629,948 A | * | 5/1997 | Hagiwara et al. | 714/748 |
| 6,501,732 B1 | * | 12/2002 | Xu et al. | 370/235 |
| 6,519,731 B1 | * | 2/2003 | Huang et al. | 714/751 |
| 6,798,842 B2 | * | 9/2004 | Jiang | 375/295 |

(Continued)

FOREIGN PATENT DOCUMENTS

| | | |
|---|---|---|
| EP | 1389848 A1 | 2/2004 |
| EP | 1699158 A1 | 9/2006 |

OTHER PUBLICATIONS

PCT International Search Report, mailed Nov. 20, 2008, in connection with International Application No. PCT/SE2008/050539.

(Continued)

*Primary Examiner* — Amine Riad
(74) *Attorney, Agent, or Firm* — Potomac Patent Group PLLC

(57) ABSTRACT

A first transceiver that supports hybrid Automatic Repeat Request (hybrid ARQ) functionality is operated. Initially, it is operated to transmit data blocks having a nominal maximum data block size, $M_0$. In response to detecting that a second transceiver does not have sufficient soft buffer memory space to store data blocks associated with an anticipated number of active hybrid ARQ processes, the transceiver is operated to transmit data blocks having a reduced data block size, M'. The anticipated number of active hybrid ARQ processes can be, for example, higher than a nominal number of active hybrid ARQ processes.

16 Claims, 7 Drawing Sheets

U.S. PATENT DOCUMENTS

| | | | |
|---|---|---|---|
| 7,003,709 B2 * | 2/2006 | Wengerter et al. | 714/748 |
| 7,164,655 B2 * | 1/2007 | Li | 370/232 |
| 7,283,508 B2 * | 10/2007 | Choi et al. | 370/341 |
| 7,298,730 B2 * | 11/2007 | Wu | 370/349 |
| 7,685,492 B2 * | 3/2010 | Parkvall et al. | 714/748 |
| 7,797,605 B2 * | 9/2010 | Garrett et al. | 714/748 |
| 7,813,296 B2 * | 10/2010 | Lindoff et al. | 370/252 |
| 7,979,769 B2 * | 7/2011 | Chun et al. | 714/748 |
| 8,045,513 B2 * | 10/2011 | Kim et al. | 370/329 |
| 8,170,476 B2 * | 5/2012 | Michel et al. | 455/13.4 |
| 2005/0276266 A1 * | 12/2005 | Terry | 370/394 |
| 2006/0104242 A1 * | 5/2006 | Kim et al. | 370/329 |
| 2006/0200722 A1 * | 9/2006 | Braun | 714/748 |
| 2008/0005638 A1 * | 1/2008 | Kuo et al. | 714/748 |
| 2008/0187030 A1 * | 8/2008 | Khan | 375/219 |
| 2009/0201813 A1 * | 8/2009 | Speight | 370/235 |
| 2010/0023830 A1 * | 1/2010 | Wengerter et al. | 714/748 |
| 2010/0061345 A1 * | 3/2010 | Wengerter et al. | 370/335 |
| 2010/0115360 A1 * | 5/2010 | Seok et al. | 714/748 |
| 2010/0199141 A1 * | 8/2010 | Parkvall et al. | 714/749 |
| 2010/0246490 A1 * | 9/2010 | Lavi et al. | 370/328 |
| 2011/0013567 A1 * | 1/2011 | Torsner et al. | 370/328 |
| 2011/0222498 A1 * | 9/2011 | Chun et al. | 370/329 |
| 2012/0014281 A1 * | 1/2012 | Chun et al. | 370/252 |
| 2012/0033606 A1 * | 2/2012 | Chun et al. | 370/315 |

OTHER PUBLICATIONS

3GPP TSG-RAN WG1 #49bis "On the number of hybrid ARQ processes in LTE Section 4" Orlando, Jun. 25-29, 2007, Source: Ericsson, R1-073027.

Cheng, Jung-Fu (Thomas) "Coding Performance of Hybrid ARQ Schemes" IEEE Transactions on Communications, vol. 54, No. 6, pp. 1017-1029, Jun. 2006.

* cited by examiner

| km | $T_p$ | $T_{TA}$ | Downlink | | | Uplink | | |
|---|---|---|---|---|---|---|---|---|
| | | | $T_{RX,UE}$ | $T_{TX,NB}$ | $N_{proc}$ | $T_{RX,NB}$ | $T_{TX,NB}$ | $N_{proc}$ |
| 1 | 0.003 | 0.007 | 1.993 | 3.000 | 7 | 3.000 | 1.993 | 7 |
| 2 | 0.007 | 0.013 | 1.987 | 3.000 | 7 | 3.000 | 1.987 | 7 |
| 3 | 0.010 | 0.020 | 1.980 | 3.000 | 7 | 3.000 | 1.980 | 7 |
| 4 | 0.013 | 0.027 | 1.973 | 3.000 | 7 | 3.000 | 1.973 | 7 |
| 5 | 0.017 | 0.033 | 1.967 | 3.000 | 7 | 3.000 | 1.967 | 7 |
| 10 | 0.033 | 0.067 | 1.933 | 3.000 | 7 | 3.000 | 1.933 | 7 |
| 20 | 0.067 | 0.133 | 2.867 | 3.000 | 8 | 3.000 | 2.867 | 8 |
| 30 | 0.100 | 0.200 | 2.800 | 3.000 | 8 | 3.000 | 2.800 | 8 |
| 40 | 0.133 | 0.267 | 2.733 | 3.000 | 8 | 3.000 | 2.733 | 8 |
| 50 | 0.167 | 0.333 | 2.667 | 3.000 | 8 | 3.000 | 2.667 | 8 |
| 100 | 0.333 | 0.667 | 2.333 | 3.000 | 9 | 3.000 | 2.333 | 8 |
| 200 | 0.667 | 1.333 | 2.667 | 3.000 | 9 | 3.000 | 2.667 | 9 |

DATA BLOCK SIZE MANAGEMENT IN A COMMUNICATION SYSTEM UTILIZING HYBRID AUTOMATIC REPEAT REQUESTS WITH SOFT COMBINING

FIELD OF THE INVENTION

The present invention relates to methods and apparatuses in wireless communication systems, and more particularly to management of data block size in communication systems having a flexible number of Hybrid Automatic Repeat Request (HARQ) processes.

BACKGROUND

Modern cellular packet-switched communication systems such as High Speed Packet Access (HSPA) and Long Term Evolution (LTE), both specified by the Third Generation Partnership Project (3GPP), employ a Hybrid Automatic Repeat ReQuest (HARQ) protocol in their respective Medium Access Control (MAC) layers. A fundamental function of the HARQ protocol is the correction of block errors that occur over the air interface. Forward Error Correction (FEC) coding is applied to the transmitted data so that the receiver will be able to not only detect the presence of errors in received data, but also to correct some errors. When it cannot correct all of the errors in a received block of data, a request is made for retransmission of that block so that another attempt to receive the correct data can be made.

The HARQ protocols specified in LTE and HSPA utilize so-called "HARQ processes" to transfer data. The HARQ processes are used to associate a potential retransmission with its original transmission in order to enable soft combining at the HARQ receiver. Only when the HARQ receiver has reported correct reception of the data sent on an HARQ process may that HARQ process be used to transmit new data. Consequently, before the reception of an HARQ status report from the receiver, the HARQ sender cannot know whether it should send new data or a retransmission of the "old data". In the meantime, it therefore, "stops and waits" (hence the name of this type of operation) until it knows the result of the transmission. In order to still be able to utilize the link during these waiting periods, the mentioned systems apply a number of such HARQ processes in parallel in order to allow continuous transmission to occur. This is illustrated in FIG. 1, which is a signal flow diagram of exemplary data transmissions from a radio base station (e.g., a NodeB) to a user equipment (UE). In this example, six HARQ processes are responsible for transmitting transmission blocks (TrBlk) in respective ones of six successive transmission time intervals (TTI), each lasting 2 ms. Data is supplied by transmission buffers for transmission to the UE.

In this example, a first transmission block TrBlk1 is transmitted in HARQ process 1 (step 101). It is presumed for the sake of example that the signal becomes sufficiently corrupted through the channel (step 103) so that the corresponding HARQ process in the UE ("receiver processing 1") will be unable to generate error-free data from the received signal. Accordingly, the receiver process 1 sends a negative acknowledgement ("NAK") to the radio base station 105. The HARQ processes in the receiver take the same amount of time, so that the radio base station can expect to receive either a positive acknowledgement ("ACK") or the negative acknowledgement a fixed amount of time (in this example, 5 ms) after transmission of a transmission block.

While the receiver process 1 is operating and its corresponding HARQ process on the transmit side is waiting for some sort of acknowledgement, the remaining HARQ processes in the radio base station continue to transmit their transmit blocks. In this example, this means that transmitter-side HARQ processes 2, 3, 4, 5, and 6 send their respective transmission blocks TrBlk2, TrBlk3, TrBlk4, TrBlk5, and TrBlk6.

The NAK from receiver process 1 is received at the radio base station at some point during the TTI associated with transmitter-side HARQ process 6. Recognizing that its previously transmitted transmission block (i.e., TrBlk1) was not correctly received, the transmitter-side HARQ process 1 uses its allocated TTI to retransmit that transmission block rather than transmitting a new transmission block (step 107).

In this example, the second and third transmission blocks TrBlk2, TrBlk3 were correctly received by their respective receiver processes. Consequently, following transmitter-side HARQ process 1's retransmission of the first transmission block, subsequent TTIs are used by respective HARQ processes 2 and 3 to transmit new transmission blocks TrBlk7 and TrBlk8.

In this example, it is assumed that the retransmission of the first transmission block TrBlk1 enabled the receiver process 1 to successfully generate error-free data. Accordingly, receiver process 1 returns a positive acknowledgement (ACK) to the transmitter (step 109). This enables the transmitter-side HARQ process 1 to transmit a different data block during its next allotted TTI (step 111).

To facilitate coherency of explanation, the example has focused on various aspects of the communication of the first transmission block TrBlk1 from the radio base station to the UE. However, FIG. 1 shows other successful as well as unsuccessful transmissions. For example, transmitter-side process 4's first attempt to transmit the fourth transmission block TrBlk4 also results in a corrupted signal being received by the UE (step 113). Consequently, receiver process 4 ends up returning a negative acknowledgement (step 115) which, in turn, causes transmitter-side HARQ process 4 to retransmit the fourth transmission block TrBlk4 (step 117) rather than transmitting a previously untransmitted block.

It will be apparent that, given the process as described above, correctly received transmission blocks in the UE may not be generated in order. For example, in this instance transmission blocks TrBlk2, TrBlk3. TrBlk5, and TrBlk6 are correctly received prior to error-free receipt of the first transmission block TrBlk1. Accordingly, the receiver processes supply their error-free outputs to a reordering functionality, so that the original sequence of data blocks can be recreated.

The number of hybrid ARQ processes should match the roundtrip time between the UE and the NodeB, including their respective processing time, to allow for continuous transmission to a UE. This type of matching is illustrated in the example of FIG. 1, discussed above. Using a larger number of processes than motivated by the roundtrip time does not provide any gains and only serves to introduce unnecessary delays between retransmissions. Thus, when communicating over a smaller distance (e.g., in small cells), a small number of hybrid ARQ processes should be used to minimize delays, while at larger distances (e.g., in large cells), a larger number of hybrid ARQ processes is necessary if continuous transmission is to be supported. This calls for the number of hybrid ARQ processes to be configurable.

One important part of hybrid ARQ in many embodiments is the use of soft combining. With soft combining, the receiver (for instance the terminal or UE when downlink transmissions are considered) does not discard soft information when it cannot decode a data block as would be the case with traditional hybrid ARQ protocols. Instead, the receiver combines soft information from previous transmission attempts with the current retransmission to increase the probability of successful decoding. It is known (e.g., from the document "Coding Performance of Hybrid ARQ schemes", J.-F. Cheng, IEEE Transaction on Communications. vol. 54, no. 6, pp. 1017-1029, June 2006) that using soft information is useful for increasing the probability of successful decoding. It has also been known that the soft combining gains can be significantly enhanced if the HARQ protocol is operated in the incremental redundancy (IR) mode, in which new coded bits are sent in retransmissions, rather than in the Chase combining mode, in which the original coded packet is simply repeated in retransmissions. For instance, the additional soft combining gains for operating the IR rather than the Chase mode are shown in the graphs of FIG. 2. The additional soft combining gains of the IR HARQ mode can be quite substantial and provide larger benefits to the throughput and stability to system operations. Note that the extent of the additional IR gains depends on the rate of the mother code at which the protocol is operated. In both the WCDMA and LTE systems, rate 1/3 mother codes have been chosen to provide good coverage as well as to ensure substantial IR gains over a wide range of operating scenarios.

To implement soft combining, the receiver needs to be able to buffer the generated soft bits while waiting for a retransmission of erroneously received data. Each hybrid ARQ process must have its own buffer. Thus, the larger the number of hybrid ARQ processes, the larger the amount of buffer memory that the receive needs to be equipped with. At the same time, it is desirable to minimize the amount of soft buffer memory in order not to unnecessarily increase the device cost.

Coded bits that will not fit within the receiver's soft buffer should not be transmitted. To use the High-Speed Downlink Packet Access (HSDPA) system as an example, this problem is solved by using a two-stage rate matching arrangement, such as that which is illustrated in FIG. 3. Following generation of systematic bits as well as first and second parity bits by logic configured to apply coding to data 301, a first rate matching (RM) stage 303 is used to limit the number of coded bits to the available UE soft buffer for the hybrid ARQ process currently being addressed. The first rate matching stage 303 punctures a sufficient number of coded bits to ensure that all coded bits supplied at its output will fit in the receiver's soft buffer. A counterpart buffer 305, known as the "virtual IR buffer", is provided at the transmitter side. (As the name implies, the buffer 305 exists on the logical level, but may not necessarily physically exist in a particular embodiment.) Hence, depending on the soft buffer size in the UE, the lowest code rate may be higher than the mother code rate (e.g., rate-1/3) in the Turbo coder. Note that if the number of bits from the channel coding does not exceed the UE soft-buffering capability, the first rate matching stage is transparent; that is, no puncturing is performed.

A second rate matching stage 305 serves two purposes:
Matching the number of bits in the virtual IR buffer to the number of available channel bits. The number of available channel bits is given by the size of the channelization-code set and the modulation scheme selected for the TTI.
Generating different sets of coded bits as controlled by the two redundancy version parameters r and s, described in the following text.

To support full incremental redundancy, that is, to have the possibility of transmitting only/mainly parity bits in a retransmission, puncturing of systematic bits is possible as controlled by the parameter s. Setting s=1 implies that the systematic bits are prioritized and puncturing is primarily applied with an equal amount to the two parity-bit streams. On the other hand, for a transmission prioritizing the parity bits, s=0 and primarily the systematic bits are punctured.

The parameter r controls the puncturing pattern in each rate-matching block in FIG. 3 and determines which bits to puncture. Typically, r=0 is used for the initial transmission attempt. For retransmissions, the value of r is typically increased, effectively leading to a different puncturing pattern. Thus, by varying r, multiple, possibly partially overlapping, sets of coded bits representing the same set of information bits can be generated. It should be noted that changing the number of channel bits by changing the modulation scheme or the number of channelization codes also affects which coded bits are transmitted even if the r and s parameters are unchanged between the transmission attempts.

The two-stage rate matching successfully addresses the problem of not transmitting more bits than can be stored in the soft buffer. The inventors of the present invention have considered, however, that it has a number of drawbacks. For example, testing such an arrangement is cumbersome because of the large number of combinations of puncturing patterns resulting from the use of two independent stages. The inventors have further observed that the puncturing resulting from combining two independent rate matching stages may, in certain cases, be a less appropriate choice compared to a single rate matching stage.

Further, since the IR protocol is operated on the output bits of the first stage rate matcher 303, the mother code for the IR protocol is effectively changed. In particular, the effective mother code rate is raised because some coded bits are punctured as a result of the first stage rate matching and are never accessible by the IR protocol. As shown in FIG. 2, the IR gains become less and less effective as the first stage rate matcher 303 punctures away more and more coded bits. From this perspective, it can be argued that the 2-stage rate matching solution shifts the costs of reliable communication from the UE side to the system side. That is, while the solution benefits low-end UEs by allowing them to claim support of data rates higher than their soft value buffers actually permit, the system throughput can suffer from the loss of IR gains.

For at least these reasons, a single-stage rate matching scheme that is capable of supporting a variable number of hybrid ARQ processes is of interest.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods and apparatuses in a first transceiver that supports hybrid Automatic Repeat Request (hybrid ARQ) functionality. This involves initially operating the first transceiver to transmit data blocks having a nominal maximum data block size, $M_0$. In response to detecting that a second transceiver does not have sufficient soft buffer memory space to store data blocks associated with an anticipated number of active hybrid ARQ processes, the first transceiver is operated so as to transmit data blocks having a reduced data block size, M'.

In some embodiments, the nominal maximum data block size, $M_0$, is used when the first transceiver (700) has a nominal number, $N_0$, of active hybrid ARQ processes; and the anticipated number of active hybrid ARQ processes is a number, N' of active hybrid ARQ processes, wherein N'>$N_0$. In some of these embodiments:

N'=$N_0$+Δ, wherein Δ is an amount by which the anticipated number of active hybrid ARQ processes exceeds the nominal number of active hybrid ARQ processes;

B is a total amount of soft buffer capability in the second transceiver;

R is a code rate of a data block encoding; and the reduced data block size, M', satisfies:

$$M'=R\times(B/N')=R\times(B/(N_0+\Delta)).$$

In another aspect, an equal number of bits are allocated to each of the anticipated number of active hybrid ARQ processes.

In some embodiments, detecting that the second transceiver does not have sufficient soft buffer memory space to store data blocks associated with the anticipated number of active hybrid ARQ processes comprises detecting that a propagation delay between the first transceiver and the second transceiver is greater than T$N_0$, wherein T is a transmission time interval for one data block. In some of these embodiments, the number of active hybrid ARQ processes is increased in response to this detection.

In some embodiments, detecting that the second transceiver does not have sufficient soft buffer memory space to store data blocks associated with the anticipated number of active hybrid ARQ processes comprises detecting that the second transceiver has less processing capability than a nominal amount. In some of these embodiments, the number of active hybrid ARQ processes is increased in response to this detection.

In some embodiments, wherein detecting that the second transceiver does not have sufficient soft buffer memory space to store data blocks associated with the anticipated number of active hybrid ARQ processes comprises maintaining a count value that represents the amount of not-yet-acknowledged transmitted data blocks; and detecting that the count value satisfies a predetermined relationship with a threshold count value.

BRIEF DESCRIPTION OF THE DRAWINGS

The objects and advantages of the invention will be understood by reading the following detailed description in conjunction with the drawings in which:

FIG. 6 is a table showing exemplary numbers of hybrid ARQ processes for different eNodeB-to-UE distances.

DETAILED DESCRIPTION

Figure 1:
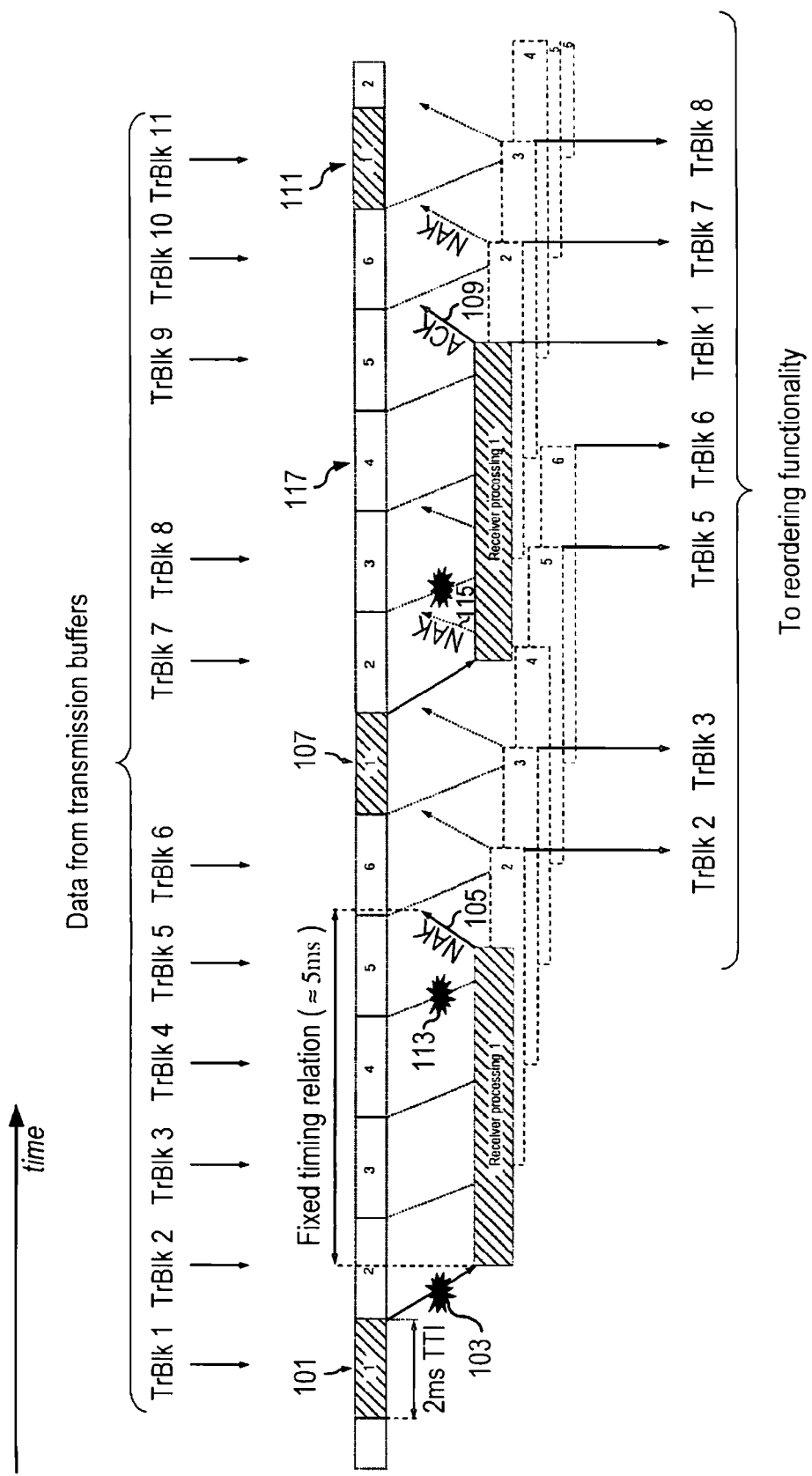
FIG. 1 is a signal flow diagram of exemplary data transmissions from a radio base station to a user equipment.
Figure 2:
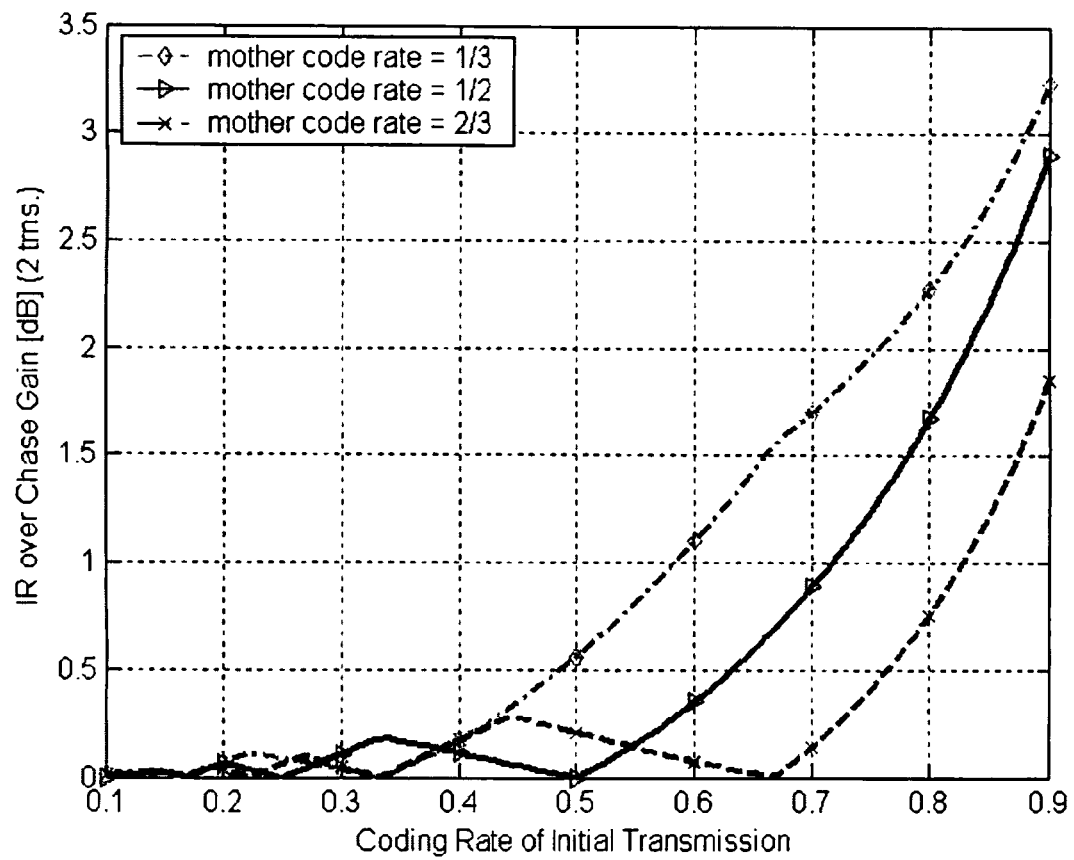
FIG. 2 is a set of graphs showing the additional soft combining gains achieved from use of incremental redundancy mode rather than the Chase mode.
Figure 3:
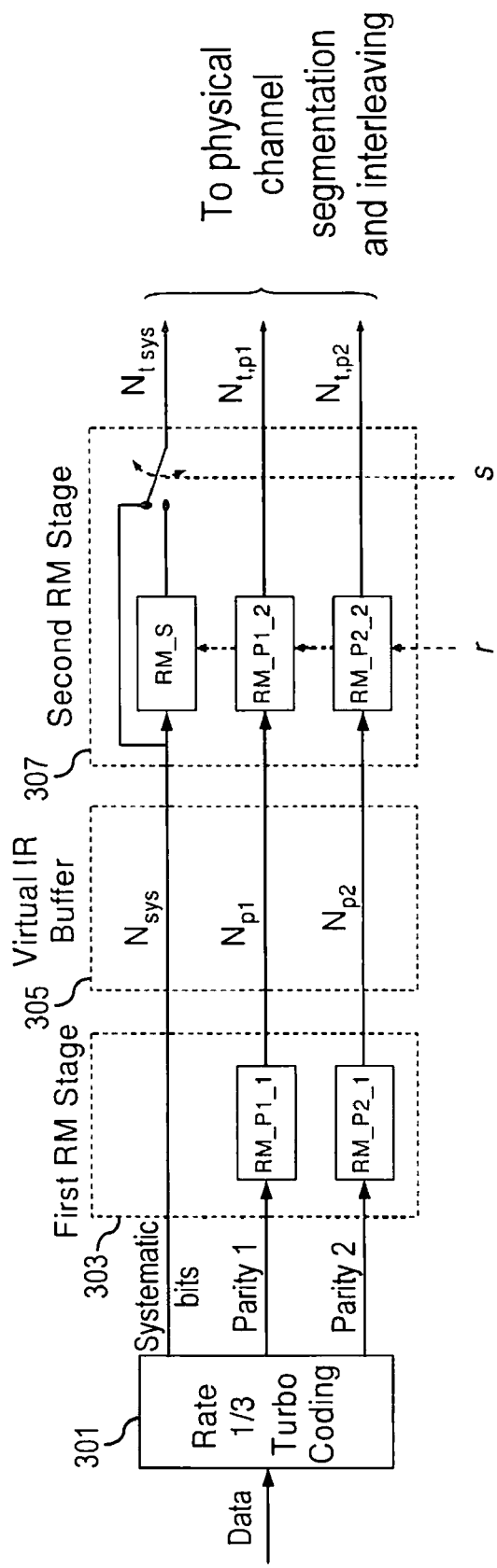
FIG. 3 is a block diagram of an exemplary two-stage rate matching arrangement for use in a transmitter.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments may be referred to herein as "logic configured to" perform a described action, or alternatively as "logic that" performs a described action.

In an aspect of embodiments consistent with the invention, the maximum data block size is limited as a function of the number of active hybrid ARQ-processes in order to ensure that the receiver will have a sufficient amount of soft buffer memory. This and other aspects are discussed in the following.

In this description, LTE-system arrangements and terminology are used as a non-limiting example. However, it is to be understood that the present invention is not limited to application in such systems but rather is also applicable to other communication systems applying hybrid ARQ-processes.

Let the number of hybrid ARQ processes be denoted by N. This corresponds to a delay between retransmissions in a hybrid ARQ process of TN, where T is the transmission time interval for one data block. Furthermore, let the total amount of soft buffer capability in the receiver be denoted by B. In one conceivable but non-limiting embodiment, the memory is evenly split among the processes, resulting in each process having the ability to buffer B/N soft bits. However, non-even division of the amount of memory between the processes is also possible. Assuming a code rate of R, with B/N soft bits per process, the maximum possible data block size that can be transmitted in a process is given by M=R×(B/N). Thus, for a nominal number of hybrid ARQ processes of $N_0$, each hybrid ARQ process can carry a maximum data block size of $M_0$=R×(B/$N_0$), resulting in a peak data rate of $M_0$/T. This is the design point when determining the buffer sizes and transmission capabilities of the system.

If the number of hybrid ARQ processes needs to be increased by an amount, Δ, to N'=$N_0$+Δ, for example due to a larger propagation delay than is supportable by $N_0$ processes, the maximum data block size is limited to M'=R×(B/N')=R×(B/($N_0$+Δ)). This ensures that the receiver will still be able to buffer all the bits that the transmitter may transmit.

The peak data rate in this case is reduced to M'/T instead of M/T, but as an increase in the number of hybrid ARQ processes typically is motivated by operation in a large cell, the data rates are often already limited by the available link budget so the reduction in data block size does not typically cause any further restriction. Furthermore, at lower data rates, higher-layer protocols such as Transmission Control Protocol (TCP) typically are less sensitive to an increase in retransmission delays. Finally, as the increase in the number of hybrid ARQ processes typically is small (e.g., 10 processes instead of nominally 8), the corresponding reduction in data rate is also small.

An increase in the number of hybrid ARQ processes can also be motivated by the use of equipment having less processing capabilities and a correspondingly longer time for processing transmission/reception of data. This is likely to correspond to a low-end device not supporting operation at the highest data rates, which makes low delays less important.

The embodiments described above are based on the principle that the greater the number of active hybrid ARQ processes, the more soft buffer memory will be used in the receiver. Accordingly, the maximum data block size is reduced from a nominal size when more than the nominal number of hybrid ARQ processes are active. The principle of dynamically adjusting the maximum data block size as a function of the amount of soft buffer memory being used in the receiver can be generalized by letting the transmitter maintain a count value that represents the amount of not-yet-acknowledged data (i.e., the count value represents the amount of soft buffer memory in use) instead of the more static division of memory between processes described above. In operation, the count value is periodically checked to determine whether it satisfies a predetermined relationship with a threshold count value (e.g., the count value may be compared with a threshold count value to determine whether the count value exceeds the threshold count value).

By knowing the total amount of soft buffer memory that is available, the count value accordingly informs the transmitter how much unused soft buffer memory remains in the receiver. Based on this information, the transmitter can determine the maximum allowable data block size for the next transmission. When it is determined that the amount of used soft buffer memory in the receiver is higher than a nominal amount, the maximum data block size can be reduced by a corresponding amount to help ensure that there is sufficient memory in the receiver to store subsequently transmitted data blocks. This is also beneficial with regard to the system throughput. For example, if the link quality is particularly good in a certain time interval (meaning that fewer retransmissions are to be expected, so that the receiver will not be expected to need as much soft buffer memory), it would be good to pump as much data through at that point (i.e., by increasing the maximum data block size) rather than being limited by a fixed allocation.

Figure 4:
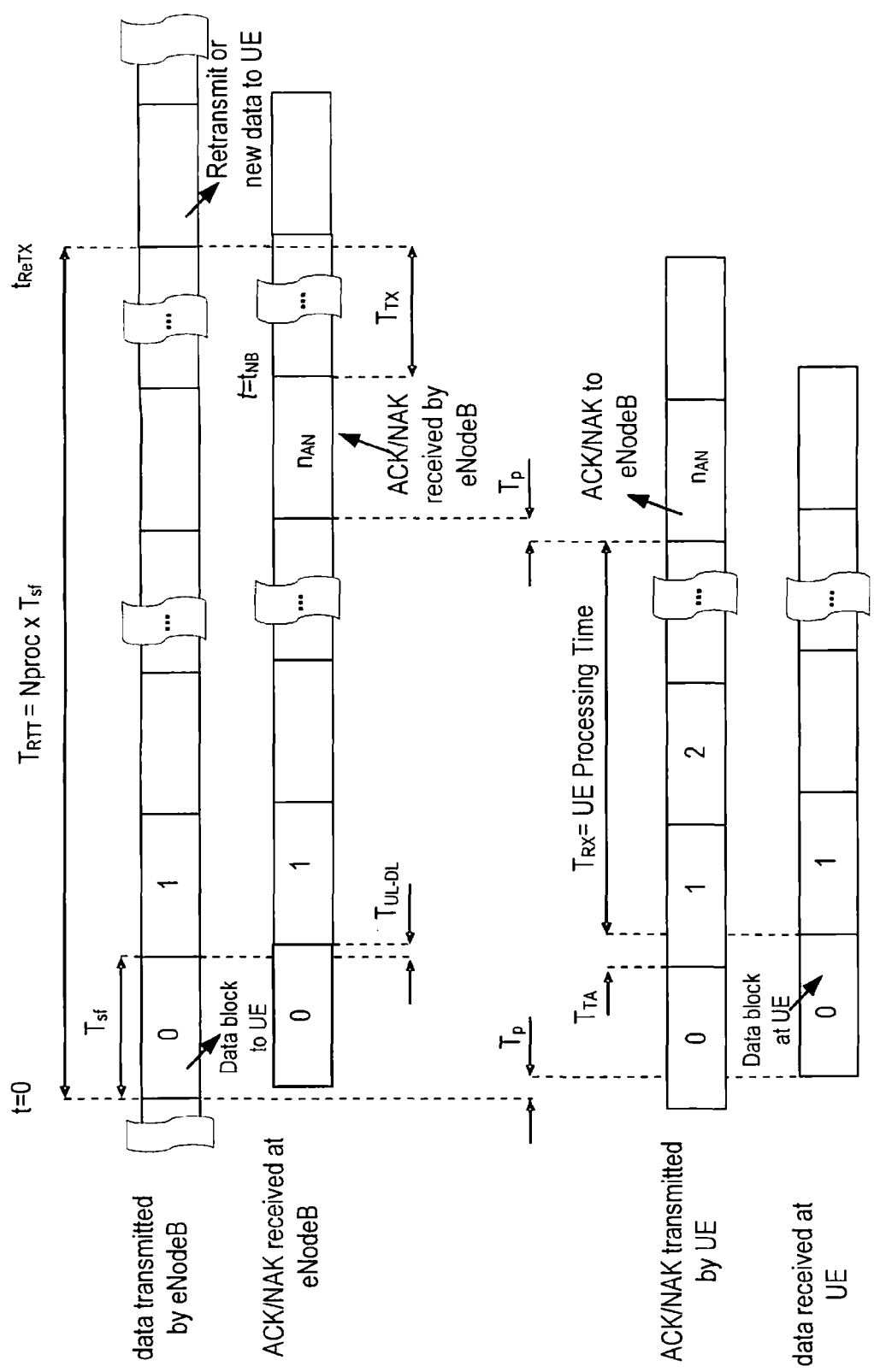
FIG. 4 illustrates exemplary timing of downlink data block transmissions.
Figure 5:
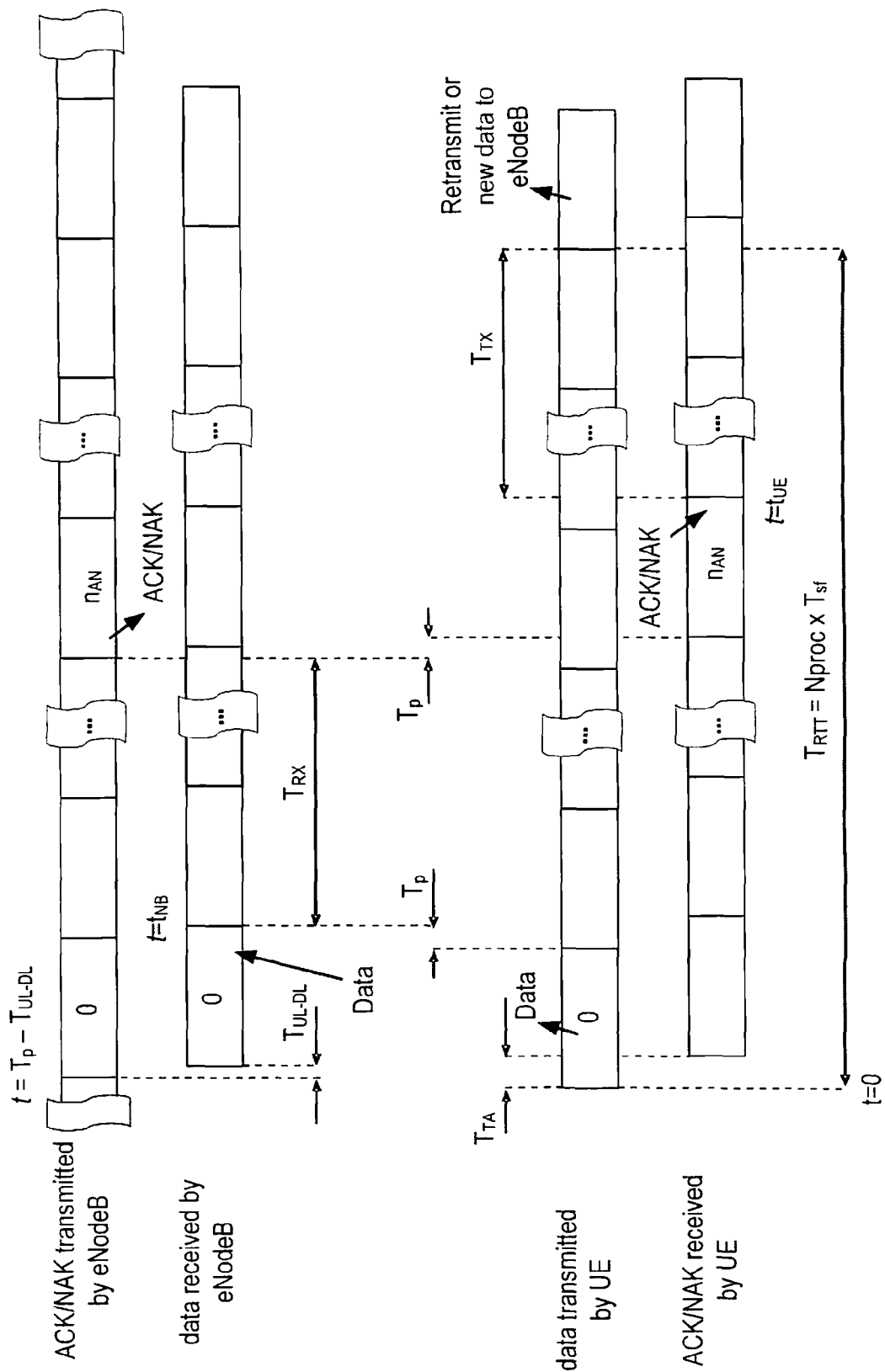
FIG. 5 illustrates exemplary timing of uplink data block transmissions.

Regarding the number of hybrid ARQ processes, the timing for downlink and uplink transmissions in frequency division duplex (FDD) embodiments is illustrated in FIGS. 4 and 5, respectively. Turning attention first to FIG. 4, an eNodeB transmits a data block in each of a number of sequential sub-frames. To take sub-frame 0 as an example, a data block is transmitted by the eNodeB at time t=0, and is received at the UE after a propagation delay, $T_p$. The UE processes the received data block for an amount of time, $T_{RX}$, after which it transmits its ACK/NACK to the eNodeB. In this example, that transmission occurs during an uplink time slot denoted $n_{AN}$. It will be observed that the UE's uplink time slots begin at a time that coincides with the end part of receiving the downlink data block. That amount of overlap is an amount $T_{TA}$, which represents a timing advance whose purpose is to permit the UE's transmissions to be received at an uplink slot boundary at the eNodeB. As is well-known in the art the amount of timing advance depends on, for example, the distance between the eNodeB and the receiver.

The UE's ACK/NAK is received by the eNodeB after the propagation delay, $T_p$. It will be observed that the eNodeB's uplink time slots begin at a time that is slightly delayed from its downlink time slots by an amount $T_{UL\text{-}DL}$ to account for a propagation delay between the eNodeB and the UE's that it serves. Once the ACK/NAK has been completely received by the eNodeB (in this example, this occurs at time $t=t_{NB}$), the eNodeB processes it for an amount of time herein denoted $T_{TX}$. If this processing shows that an ACK was received, then in the next available downlink time slot the eNodeB transmits new data to the UE. If, however, a NAK was received, then the data block originally transmitted in time slot 0 is retransmitted. The next available time slot during which either a new data block or a retransmission occurs is determined is separated from the original transmission (e.g., time slot 0) by an amount of time $T_{RTT}$, which is equal to the number of active hybrid ARQ processes, $N_{proc}$ multiplied by the duration of one time slot, $T_{SF}$.

FIG. 5 is a timing diagram illustrating uplink data transmissions (i.e., from a UE to an eNodeB). A data block is transmitted by the UE to the eNodeB in an uplink time slot 0. The data block is received, after a propagation delay, at the eNodeB in the eNodeB's uplink time slot 0. The eNodeB processes the received data block for an amount of time, $T_{RX}$, after which the eNodeB transmits an ACK/NAK: if the data block was received without error, then an ACK is transmitted; otherwise a NAK is transmitted.

After a propagation delay, $T_p$, the eNodeB's ACK/NAK is received by the UE. Reception of the ACK/NAK is complete at a time denoted $t=t_{UE}$, after which it is processed by the UE for an amount of time $T_{TX}$. In the next available time slot following that processing time, the UE either retransmits the data block originally transmitted in time slot 0 (if a NAK was received), or else a new data block is transmitted.

As seen in the figures, the number of processes depends on the propagation delay as well as the respective processing speeds of the UE and the eNodeB. The processing speed in the UE and the eNodeB is highly implementation-dependent. Taking reasonable implementation constraints into account, a time of approximately 2 ms for UE processing (decoding for the case of downlink transmission and encoding/multiplexing for the case of uplink transmission) and approximately 2-3 ms for eNodeB processing (scheduling/multiplexing/encoding for the case of downlink transmission and decoding for the case of uplink transmission) is found reasonable. The propagation delay depends on the distance between the UE and the eNodeB and typically amounts to 6.7 μs/km. Thus, for smaller cells, the propagation delay is small compared to the processing delays in the UE and eNodeB, but for very large cells, the propagation delay cannot be neglected.

An example of the number of hybrid ARQ processes for different eNodeB-to-UE distances is shown in the table presented in FIG. 6. In this example, 7 hybrid ARQ processes are sufficient for cell ranges up to approximately 15 km, while a larger number is required for larger cells. Thus, being able to configure the number of hybrid ARQ processes would enable the hybrid ARQ roundtrip time to be minimized in smaller cells while still supporting larger cells. Accordingly, the various aspects described herein provide a limited degree of configurability in the number of hybrid ARQ processes.

In principle, there is no reason why uplink and downlink processing times should be identical; the amount of processing time for uplink and downlink may very well differ. Thus, one might consider designing a system in which the number of active hybrid ARQ processes in the downlink direction is not the same as the number of active hybrid ARQ processes in the uplink. While such embodiments are certainly possible, keeping the number of hybrid ARQ processes the same in both downlink and uplink directions offers benefits, for example, related to Discontinuous Reception (DRX) and Discontinuous Transmission (DTX) configurations. With an identical number of hybrid ARQ processes in both directions, the UE DRX/DTX cycle could be configured such that transmission of ACK/NAK feedback and data coincides in both directions. This increases the amount of time the UE can use DRX and increases battery life. Thus, according to one embodiment of the present invention the number of hybrid-ARQ processes is the same in downlink and uplink.

Regarding soft buffer memory and rate matching the amount of soft buffer memory at the receiving end (UE in the downlink and eNodeB in the uplink) is limited: for any given total buffer size, the larger the number of hybrid-ARQ processes, the smaller the amount of memory per process. The amount of soft buffer memory available in a UE can depend on the UE category such that a high-end UE has a larger soft buffer than a low-end UE. Thus, in another aspect of embodiments consistent with the invention, the maximum data block size can by adjusted based on the UE's soft buffer memory capacity, such that that memory will be able to store the data blocks associated with a number of active hybrid ARQ processes.

Figure 7:
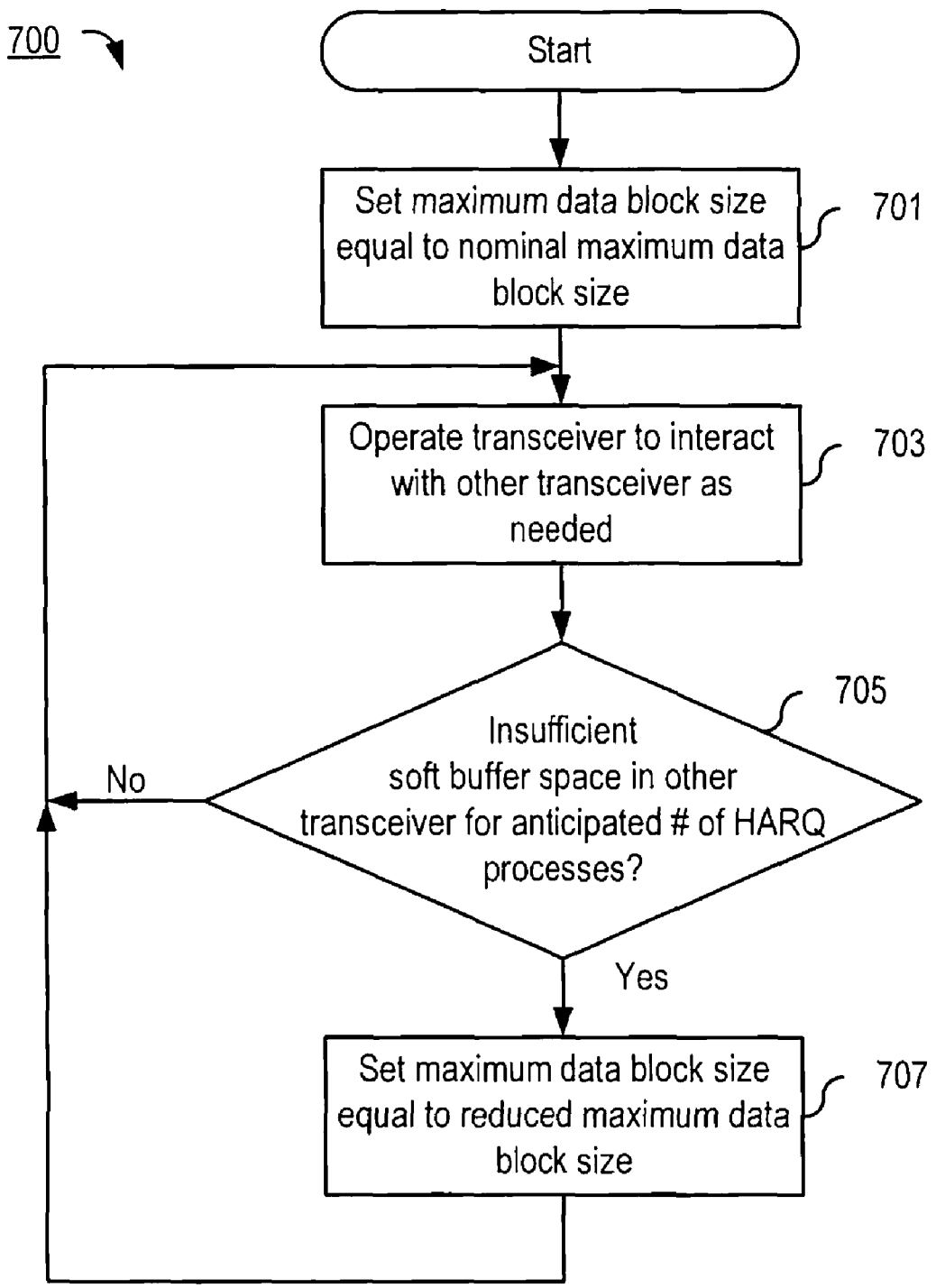
FIG. 7 is, in one respect, a flow chart of exemplary steps/processes carried out in a transceiver in accordance with aspects of embodiments consistent with the invention, and in another respect, a block diagram of a transceiver that includes logic configured to perform the exemplary functions in accordance with one or more aspects of the invention.

FIG. 7 is, in one respect, a flow chart of exemplary steps/processes carried out in a transceiver in accordance with aspects of embodiments consistent with the invention. FIG. 7 can also be considered to be a transceiver 700 that includes logic configured to perform the variously described exemplary functions.

In this example, the transceiver 700 (e.g., an eNodeB or a UE) sets the maximum data block size equal to a nominal maximum data block size value (step 701). The transceiver 700 then uses this maximum data block size setting when it carries out its interactions with a another transceiver (step 703). These interactions can be, for example, data block transmissions as illustrated in FIGS. 5 and 6.

The continued functioning of the transceiver 700 is based on whether it detects that there is insufficient soft buffer space in the other transceiver to carry out data block transmissions using an anticipated number of hybrid ARQ processes (decision block 705). If this is not the case (i.e. the soft buffer space in the other transceiver is sufficient) ("NO" path out of decision block 705), then the transceiver's operation continues as before.

However, if the transceiver 700 detects that there is insufficient soft buffer space in the other transceiver for an anticipated number of hybrid ARQ processes ("YES" path out of decision block 705), then the maximum data block size is reduced in a way that will alleviate the problem. For example, if the propagation delay between the transceiver 700 and the other transceiver increases, it is desirable to increase the number of active hybrid ARQ processes. Since the total amount of soft buffer memory in the other transceiver is fixed, the (first) transceiver 700 makes this increase possible by making a corresponding reduction of the maximum data block size, as described earlier.

In addition or as an alternative to detecting an increase in propagation delay, the detecting step represented by decision block 705 can be implemented in other ways, such as by detecting that the other transceiver is, for example, a type of UE having less processing capability than a nominal amount. This would imply that the UE's hybrid ARQ processing time is longer than a nominal value, which in turn makes it desirable for the (first) transceiver 700 to increase the number of active hybrid ARQ processes.

Another addition or alternative to detecting an increase in propagation delay is to detect that the other transceiver is running out of free soft buffer memory space. This can happen, for example, if channel conditions become very poor, requiring that the other transceiver store more and more data while awaiting retransmissions. Reducing the maximum data block size in response to this condition can allow additional data block transmissions to take place without using up so much of the other transceiver's soft buffer memory space.

The present invention allows for a system the advantage of, among other things, a configurable number of hybrid ARQ-processes while at the same time avoiding the complexity and performance losses of a two-stage rate matching scheme.

The invention has been described with reference to particular embodiments. However, it will be readily apparent to those skilled in the art that it is possible to embody the invention in specific forms other than those of the embodiment described above. The described embodiments are merely illustrative and should not be considered restrictive in any way. The scope of the invention is given by the appended claims, rather than the preceding description, and all variations and equivalents which fall within the range of the claims are intended to be embraced therein.

The invention claimed is:

1. A method of operating a first transceiver that supports hybrid Automatic Repeat Request (hybrid ARQ) functionality, the method comprising:
   initially operating the first transceiver to transmit data blocks having a nominal maximum data block size, $M_0$; and
   detecting that a second transceiver does not have sufficient soft buffer memory space to store data blocks associated with an anticipated number of active hybrid ARQ processes, and in response thereto operating the first transceiver to transmit data blocks having a reduced data block size, $M'$.

2. The method of claim 1, wherein:
   the nominal maximum data block size, $M_0$, is used when the first transceiver has a nominal number, $N_0$, of active hybrid ARQ processes; and
   the anticipated number of active hybrid ARQ processes is a number, $N'$ of active hybrid ARQ processes, wherein $N'>N_0$.

3. The method of claim 2, wherein:
   $N'=N_0+\Delta$, wherein $\Delta$ is an amount by which the anticipated number of active hybrid ARQ processes exceeds the nominal number of active hybrid ARQ processes;
   B is a total amount of soft buffer capability in the second transceiver;
   R is a code rate of a data block encoding; and
   the reduced data block size, $M'$, satisfies:

$$M'=R\times(B/N')=R\times(B/(N_0+\Delta)).$$

4. The method of claim 2, comprising:
   allocating an equal number of bits to each of the anticipated number of active hybrid ARQ processes.

5. The method of claim 1, wherein detecting that the second transceiver does not have sufficient soft buffer memory space to store data blocks associated with the anticipated number of active hybrid ARQ processes comprises:
   detecting that a propagation delay between the first transceiver and the second transceiver is greater than $TN_0$, wherein T is a transmission time interval for one data block.

6. The method of claim 1, wherein detecting that the second transceiver does not have sufficient soft buffer memory space to store data blocks associated with the anticipated number of active hybrid ARQ processes comprises:
   detecting that the second transceiver has less processing capability than a nominal amount.

7. The method of claim 5, comprising:
   in response to said detecting, increasing the number of active hybrid ARQ processes.

8. The method of claim 1, wherein detecting that the second transceiver does not have sufficient soft buffer memory space to store data blocks associated with the anticipated number of active hybrid ARQ processes comprises:
   maintaining a count value that represents the amount of not-yet-acknowledged transmitted data blocks; and
   detecting that the count value satisfies a predetermined relationship with a threshold count value.

9. A transceiver that supports hybrid Automatic Repeat Request (hybrid ARQ) functionality, the transceiver comprising:
- logic configured to initially operate the transceiver to transmit data blocks having a nominal maximum data block size, $M_0$; and
- logic configured to detect that a second transceiver does not have sufficient soft buffer memory space to store data blocks associated with an anticipated number of active hybrid ARQ processes, and in response thereto to operate the transceiver to transmit data blocks having a reduced data block size, $M'$.

10. The transceiver of claim 9, wherein:
- the nominal maximum data block size, $M_0$, is used when the transceiver has a nominal number, $N_0$, of active hybrid ARQ processes; and
- the anticipated number of active hybrid ARQ processes is a number, $N'$ of active hybrid ARQ processes, wherein $N'>N_0$.

11. The transceiver of claim 10, wherein:
- $N'=N_0+\Delta$, wherein $\Delta$ is an amount by which the anticipated number of active hybrid ARQ processes exceeds the nominal number of active hybrid ARQ processes;
- B is a total amount of soft buffer capability in the second transceiver;
- R is a code rate of a data block encoding; and
- the reduced data block size, $M'$, satisfies:

$$M'=R\times(B/N')=R\times(B/(N_0+\Delta)).$$

12. The transceiver of claim 10, comprising:
- logic configured to allocate an equal number of bits to each of the anticipated number of active hybrid ARQ processes.

13. The transceiver of claim 9, wherein the logic configured to detect that the second transceiver does not have sufficient soft buffer memory space to store data blocks associated with the anticipated number of active hybrid ARQ processes comprises:
- logic configured to detect that a propagation delay between the transceiver and the second transceiver is greater than $TN_0$, wherein T is a transmission time interval for one data block.

14. The transceiver of claim 9, wherein the logic configured to detect that the second transceiver does not have sufficient soft buffer memory space to store data blocks associated with the anticipated number of active hybrid ARQ processes comprises:
- logic configured to detect that the second transceiver has less processing capability than a nominal amount.

15. The transceiver of claim 13, comprising:
- logic configured to increase the number of active hybrid ARQ processes in response to said detecting.

16. The transceiver of claim 9, wherein the logic configured to detect that the second transceiver does not have sufficient soft buffer memory space to store data blocks associated with the anticipated number of active hybrid ARQ processes comprises:
- logic configured to maintain a count value that represents the amount of not-yet-acknowledged transmitted data blocks; and
- logic configured to detect that the count value satisfies a predetermined relationship with a threshold count value.

* * * * *